Nov. 29, 1932.　　　　A. COORS　　　　1,889,543
COFFEE MAKER
Filed Dec. 5, 1930

Inventor
Adolph Coors.
By A. J. O'Brien
Attorney

Patented Nov. 29, 1932

1,889,543

UNITED STATES PATENT OFFICE

ADOLPH COORS, OF GOLDEN, COLORADO, ASSIGNOR TO COORS PORCELAIN COMPANY, OF GOLDEN, COLORADO, A CORPORATION OF COLORADO

COFFEE MAKER

Application filed December 5, 1930. Serial No. 500,260.

This invention relates to improvements in coffee makers and has reference to the construction of that portion of the coffee maker which contains the coffee and the water.

In the making of drip coffee, it is customary to provide a container in the form of a water bowl of relatively large diameter which is provided with an extension of reduced diameter at its lower end. The extension constitutes a receptacle for the ground coffee and is adapted to be received in an opening of a receptacle that receives the made coffee from the coffee maker. The bottom of the reduced extension must, of course, be perforated so as to permit the coffee to drip into the container or coffee receiving receptacle. The perforated cover or spreader plate is supported in the coffee maker above the coffee and serves to distribute the water and to prevent the coffee from floating on the water.

In coffee makers of this type it is customary to cover the bottom of the extension within which the coffee is located, with filter paper so as to prevent coffee grounds from passing from the coffee maker to the coffee receptacle.

It is the object of this invention to produce a coffee maker of such construction that filter paper is not necessary and which, in addition, shall be so constructed that the coffee as it flows from the coffee maker to the receiving receptacle will produce what may be termed a suction that facilitates and increases the flow of coffee through the perforations in the bottom of the coffee maker.

The objects referred to above and others that may become apparent as this description proceeds, are attained by means of a construction and an arrangement of parts that will now be described in detail, and for this purpose reference will be had to the accompanying drawing in which the preferred embodiment of the invention has been illustrated, and in which.

Figure 1:
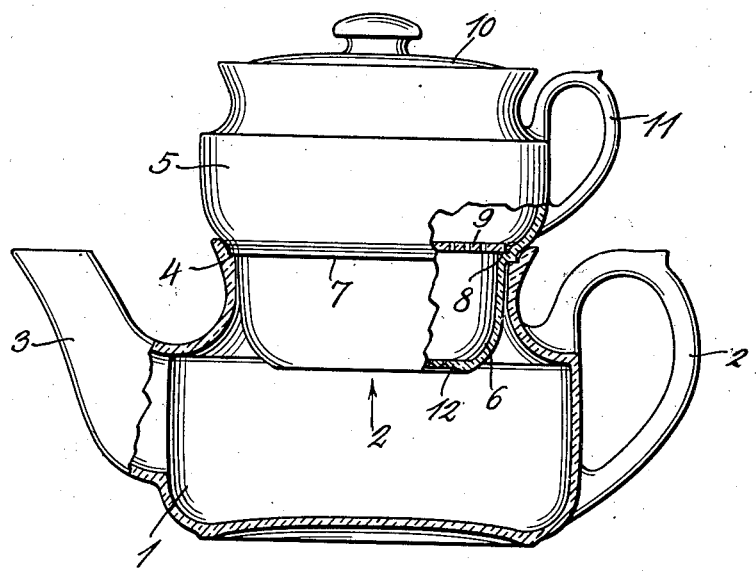
Fig. 1 is a view partly in side elevation and partly in section showing the improved coffee maker in assembled position.
Figure 2:
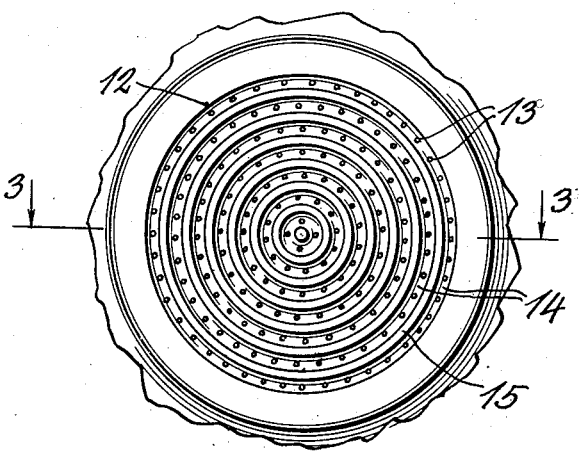
Fig. 2 is a plan view of the bottom of the coffee maker looking in the direction of arrow 2, Fig. 1.
Figure 3:
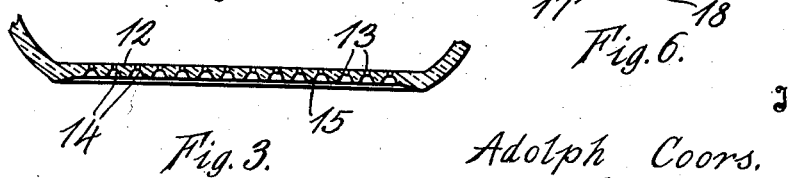
Fig. 3 is a section taken on line 3—3, Fig. 2.
Figure 4:
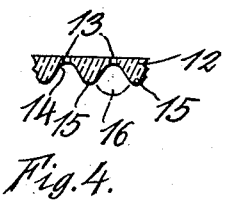
Fig. 4 is a section similar to that shown in Fig. 3, but on a somewhat larger scale and shows a small portion of the bottom.

In the drawing numeral 1 represents the receptacle for the made coffee which is provided on one side with a handle 2 and on the opposite side with a spout 3. The upper end of the receptacle is of smaller diameter than the bowl portion thereof and is provided with a shoulder 4 on which the coffee maker rests. The coffee maker is a container in the form of a water bowl having a portion 5 of relatively large diameter and an extension 6 of smaller diameter at its lower end. The extension constitutes a receptacle for the ground coffee and is adapted to be received in the opening of the coffee receiving receptacle. At the juncture of the bowl portion 5 and the extension 6 is a shoulder 7 that is adapted to rest on the shoulder 4 and to support the coffee maker in the manner shown in Fig. 1. On the inside of the coffee maker at the juncture of the extension of smaller diameter and the water bowl portion 5 is another shoulder 8 that is adapted to support a perforated cover or spreader 9. The coffee maker is provided with a removable cover 10 and has a handle 11 for convenience in handling the same. The bottom of the reduced portion has been indicated by reference numeral 12 and has a smooth upper surface. The bottom is provided with a plurality of perforations 13 which are preferably arranged in concentric circles as shown in Fig. 2. These perforations should be as small as possible. The lower surface of the bottom is provided with concentric grooves 14 that are so located that the openings 13 open into the deepest portions of the grooves as shown in Fig. 4. The grooves are formed between concentric corrugations 15, whose walls are inclined as shown in Fig. 4 and the grooves may be said to be V-shaped.

When the coffee maker is in operation the coffee rests on the upper surface of the bottom and the water that seeps through the coffee passes through the openings 13. Owing to the presence of the grooves 14, the coffee, instead of dropping down, immediately fills the grooves with coffee in the manner indicated by reference numeral 16 in Fig. 4. The coffee that accumulates in the grooves is held by the adhesion and by the surface tension until a sufficient amount has been accumulated to overcome these forces whereupon it drops into the retainer below. The presence of the grooves on the under surface of the bottom produces what may be termed a suction that tends to draw the coffee from the coffee maker and in this way the flow of liquid through the ground coffee is stimulated and its passage into the coffee receptacle below is facilitated.

Attention is particularly directed to the construction just described, because by this construction it is possible to omit the filter paper that has heretofore been considered necessary, and at the same time get a strong flow of coffee due to the suction produced by the accumulation of coffee in the grooves as has just been described.

Figure 5:
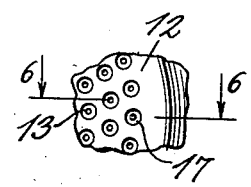
Fig. 5 is a bottom plan view of a portion of the bottom of the coffee maker showing a slightly modified form.
Figure 6:
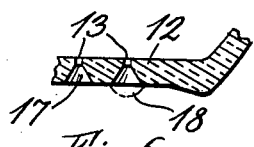
Fig. 6 is a section taken on line 6—6, Fig. 5, showing the parts to a larger scale.

In Figs. 5 and 6, a slightly modified form of construction has been shown. In this modified form the grooves have been dispensed with and the openings 13 have their lower ends flared outwardly as indicated by reference numeral 17. The openings employed in the modified form of construction resemble inverted funnels and when the liquid flows through these openings, it accumulates in drops 18, as shown in Fig. 6 and as these drops enlarge in size, the weight of the drop finally overcomes the surface tension and other forces and falls into the coffee receiving receptacle and when this occurs a suction is produced that tends to stimulate the flow of coffee from the maker to the receiving receptacle.

Attention is called to the fact that in both of the modifications shown, the openings 13 communicate at their lower ends with openings having inclined side walls that facilitate the formation of large drops which, in turn, facilitates the flow of coffee, and in both embodiments the upper surface of the bottom is flat.

The invention has been shown as formed from porcelain, as distinguished from metal, and I consider the construction above described and hereinafter claimed as especially well adapted for an article of this type made of porcelain as the use of porcelain involves certain departures from the use of metal and especially is this true with regard to the formation of corrugations and grooves as shown and described, for with the method employed in the manufacture of these articles from porcelain, the inner surface of the bottom is made in one plane.

The grooves in the under surface of the bottom, in addition to the function above explained, also serve to decrease the thickness where holes 13 pass through and it is therefore possible to make these holes very small in diameter so that coffee grounds will not enter the holes and stop them up and in this way the need of filter paper is obviated.

Further, as it is apparent that a porcelain bottom of same thickness over all as thickness at the perforations would not be of sufficient strength to be of practical use, corrugations or countersunk holes serve to overcome this difficulty.

From the above description it will be apparent that the invention described herein and which is preferably made from porcelain or other ceramic material possesses important differences of construction that greatly facilitate its operation and simplify its manufacture.

Having described the invention what is claimed as new is:

1. In a coffee maker, the combination of a container in the form of a water bowl of relatively large diameter, said bowl having an extension of reduced diameter at its lower end constituting a receptacle for the ground coffee and adapted to be received in an opening of a receptacle that receives the made coffee from said coffee maker, said reduced extension having a bottom whose upper surface is flat and which is provided with a number of substantially cylindrical perforations of small diameter and of a length slightly less than one-half the thickness of the bottom, the lower ends of the perforations terminating in the bottoms of annular grooves which have outwardly flared walls adapted to facilitate the formation of large drops.

2. In a coffee maker, the combination of a container in the form of a water bowl of relatively large diameter, said bowl having an extension of reduced diameter at its lower end constituting a receptacle for the ground coffee and adapted to be received in an opening of a receptacle that receives the made coffee from said coffee maker, said reduced extension having a bottom whose upper surface is flat, said bottom having a plurality of concentric rows of openings of small diameter and having its bottom provided with a groove for each row of openings, the sides of the grooves having inclined walls which serve to collect the coffee and produce a suction that facilitates the formation of large drops.

In testimony whereof I affix my signature.

ADOLPH COORS.